Patented Apr. 8, 1930

1,754,098

UNITED STATES PATENT OFFICE

JOSEF HALLER, OF WIESDORF-ON-THE-RHINE, GERMANY, ASSIGNOR TO GENERAL ANILINE WORKS, INC., OF NEW YORK, N. Y., A CORPORATION OF DELAWARE

PROCESS OF MAKING NAPHTHISATIN COMPOUNDS

No Drawing. Application filed November 29, 1926, Serial No. 151,608, and in Germany December 3, 1925.

In United States Patent 1,685,698, patented September 25, 1928, a convenient method for making halogenids of oxaminic acids derived from aromatic primary amines has been disclosed. This method consists substantially in reacting with an oxalylhalogenid upon a salt of an aromatic primary amine.

I have now found that the so obtained halogenids of oxaminic acids derived from aromatic primary amines of the general formula R—NH.CO.CO.Cl wherein R represents a univalent hydrocarbon radical of the naphthalene series which may contain further substituents are very valuable starting materials for the preparation of naphthisatin compounds and my invention consists in acting with condensing agents upon such naphthyloxaminic acid halogenids.

Though it was known that oxaminic acid chlorides of secondary amines, such as monoethylaniline, diphenylamine, ethyl-beta-naphthylamine, etc., when reacted upon with condensing agents produce N-substituted isatin compounds (see Ber. d. Deutschen Chem. Ges. vol. 46, page 3915, (1913) and Swiss Patent 93,487) no unsubstituted isatins could heretofore be produced from oxaminic acid chlorides of primary aromatic amines.

It was therefore not obvious at all, that primary naphthyloxaminic acid halogenids would react in a smooth manner with condensing agents to produce naphthisatins which are not substituted at the nitrogen.

The condensing agents which induce this reaction are of the type of condensing metal halogenids, such as aluminium chloride, ferric chloride, etc.

The naphthyloxaminic acid halogenids can be derived from alpha as well as beta naphthylamine or from substituted naphthylamines containing monovalent substituents in the nucleus, such as Cl, Br, $NO_2$, $OCH_3$, etc.

The reaction proceeds particularly well with the chlorides of the naphthyloxaminic acids. It is effected by heating the halogenid in presence of the condensing agent and in the presence or absence of a solvent or diluent.

It is in most instances superfluous to start from isolated naphthyloxaminic halogenids. The solutions of same as obtained directly according to United States Patent 1,685,698, by acting with an oxalylchloride upon the hydrochloride of a naphthylamine and eventual elimination of the excess oxalylchloride can be reacted upon directly with a condensing agent.

The following examples will further illustrate my invention, the parts being by weight.

*Example 1.*—50 parts of beta-naphthyloxaminic chloride of the melting point 114–115° C. and of the formula

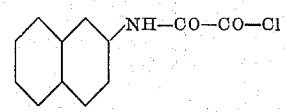

are dissolved in 200 parts of nitrobenzene and with stirring 50 parts of anhydrous aluminium chloride gradually added. The temperature during addition is preferably kept at 40–50° C. and may be increased to about 80° C. to complete the reaction. When a test sample, after steam distilling off the solvent, is completely soluble in dilute caustic soda, one pours the reaction mass upon ice and eliminates the nitrobenzene by steam distillation. The beta-naphthylisatin remains as a dark red crystalline mass which can be purified in the usual manner. The yield is 75–80% of theory.

*Example 2.*—100 parts of alpha-naphthyloxaminic chloride of the melting point 86° C. and the formula:

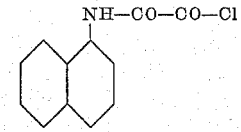

are intimately mixed with 100 parts of anhydrous aluminium chloride and heated for about 8 hours to 80–85° C. After the evolution of the hydrochloric gas has subsided one bails out the dark colored melt into dilute hydrochloric acid and thus obtains the alpha-naphthylisatin of the formula:

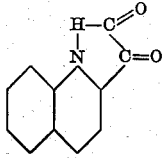

which is isolated and purified in the usual manner.

The production of this alphanaphthylisatin proceeds in a similar manner when using an indifferent solvent.

*Example 3.*—50 parts of 8-chloro-1-naphthylamine hydrochloride are introduced at low temperature into a mixture of 32 parts of oxalychloride and 200 parts chlorobenzene, after the naphthylamine salt has dissolved, one heats to about 60° C., as disclosed in United States Patent 1,685,698. A solution of 8-chloro-1-naphthyloxaminic chloride is obtained. Into this solution and at the same temperature one introduces gradually within 2–3 hours 35 parts of anhydrous aluminium chloride. After the formation of the isatin chloride is completed, one pours the reaction mass upon ice and eliminates the chlorobenzene by steam distillation. 9-chloro-1-2-naphthisatin of the formula:

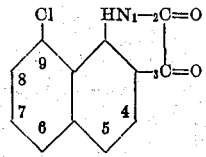

is so obtained with a good yield. It is purified over the bisulfite compound. It is easily soluble in hot glacial acetic acid, from which it is obtained as dark red leaflets, melting at 239° C.

Other 9-halogeno-1-2-naphthisatins are produced in a similar manner.

6-9-dichloro-1-2-naphthisatin is for instance obtained by crystallization from glacial acetic acid as dark red needles, melting at 275–276° C.; 9-chloro-4-bromo-1-2-naphthisatin melts at 297° C.

I claim:

1. In processes of preparing naphthisatins, the step consisting in reacting with a metal chloride condensing agent on a compound of the general formula R—NH.CO.COCl wherein R represents a univalent hydrocarbon radical of the naphthalene series which may contain further substituents.

2. In processes of preparing naphthisatins, the step consisting in reacting with anhydrous aluminum chloride on a compound of the general formula R—NH.CO.COCl wherein R represents a univalent hydrocarbon radical of the naphthalene series which may contain further substituents.

3. As new products the compounds of the general formula

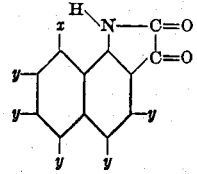

wherein $x$ represents a halogen atom and $y$ represents hydrogen or a monovalent substituent.

4. As new products, compounds of the general formula

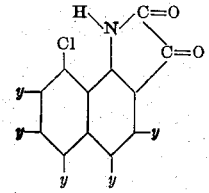

wherein $y$ represents hydrogen or a monovalent substituent.

5. As a new product the 9-chloro-1-2-naphthisatin of the formula

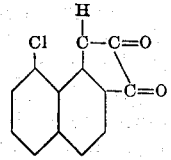

which, when crystallized from glacial acetic acid, represents dark red leaflets, melting at 239° C.

In testimony whereof, I affix my signature.

JOSEF HALLER.

Certificate of Correction

Patent No. 1,754,098.                                                   Granted April 8, 1930, to

JOSEF HALLER

It is hereby certified that error appears in the printed specification of the above numbered patent requiring correction as follows: Page 2, lines 93 to 99, strike out the formula and insert instead

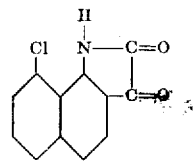

and that the said Letters Patent should be read with this correction therein that the same may conform to the record of the case in the Patent Office.

Signed and sealed this 13th day of May, A. D. 1930.

[SEAL.]

M. J. MOORE,
*Acting Commissioner of Patents.*